United States Patent
Gouge et al.

(10) Patent No.: US 8,316,120 B2
(45) Date of Patent: Nov. 20, 2012

(54) APPLICABILITY DETECTION USING THIRD PARTY TARGET STATE

(75) Inventors: Christopher Scott Gouge, Redmond, WA (US); Vibha Rathi, Redmond, WA (US); Shiaf Ramlan, Redmond, WA (US); Derek Chirk Yin Cheng, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 12/698,158

(22) Filed: Feb. 2, 2010

(65) Prior Publication Data

US 2011/0191453 A1 Aug. 4, 2011

(51) Int. Cl.
*G06F 15/173* (2006.01)
(52) U.S. Cl. ........ 709/223; 717/168; 717/173; 717/177; 717/178
(58) Field of Classification Search .................. 709/223; 717/168, 173, 178
See application file for complete search history.

(56) References Cited

U.S. PATENT DOCUMENTS

| | | | |
|---|---|---|---|
| 7,478,381 B2 | 1/2009 | Roberts et al. | |
| 7,539,686 B2 | 5/2009 | Shepard et al. | |
| 7,574,706 B2 | 8/2009 | Meulemans et al. | |
| 2002/0100036 A1* | 7/2002 | Moshir et al. | 717/173 |
| 2004/0003266 A1 | 1/2004 | Moshir et al. | |
| 2005/0228798 A1 | 10/2005 | Shepard et al. | |
| 2008/0301672 A1* | 12/2008 | Rao et al. | 717/177 |
| 2009/0007105 A1 | 1/2009 | Fries et al. | |
| 2009/0216975 A1 | 8/2009 | Halperin et al. | |
| 2009/0217255 A1 | 8/2009 | Troan | |

OTHER PUBLICATIONS

"Offline Virtual Machine Image Quick Start Guide", Retrieved at <<http://www.shavlik.com/documents/qsg-prt-6-1-offline_vm.pdf>> Aug. 2008, pp. 22.
"ESX 4 Patch Management Guide", Retrieved at <<http://www.vmware.com/pdf/vsphere4/r40/vsp_40_esxupdate.pdf>> 2009, pp. 1-24.
"McAfee VirusScan Enterprise for Offline Virtual Images", Retrieved at <<http://www.questnbs.com/McAfee_PartnerPage_Links/Datasheets/McAfee_virusscan-ent-offline-virtual-image_Datasheet.pdf>>Jun. 2008, pp. 3.
"Windows Patching and Security", Retrieved at <<http://ucstoolkit.rutgers.edu/technical/windowspatching.html>> 2005, pp. 4.

\* cited by examiner

*Primary Examiner* — Yves Dalencourt

(57) ABSTRACT

Aspects of the subject matter described herein relate to detecting needed updates. In aspects, an update agent receives a request to scan for updates for a target. The target may include a virtual or non-virtual device. The request may include one or more rules that indicate resources to check to determine attributes of the device. The update agent utilizes a resource accessor to access the resources indicated by the rules. The resource accessor maps resource names indicated by the update agent to corresponding resource names of the target. The update agent may provide results of evaluating the rules to an update source in a multi-pass protocol designed to eliminate irrelevant updates.

20 Claims, 4 Drawing Sheets

APPLICABILITY DETECTION USING THIRD PARTY TARGET STATE

BACKGROUND

As processing capability moves towards a model where functionality is managed through instances of virtual machines, customers are managing their infrastructure through libraries of virtual machine images. In this model, virtual machines are run when needed and suspended when not needed. Capacity is added by duplicating virtual machine images onto additional hardware.

As part of managing this library of images, administrators need to ensure that the software inside the images is current with the latest software updates (such as security fixes, additional functionality, and so forth). Traditionally, this has been done by running a virtual machine and then executing an update agent in the virtual machine. While this allows virtual machines to be updated, this mechanism is a significant maintenance activity that consumes compute resources and that may be time consuming and tedious for the administrators who manage the virtual machines.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to detecting needed updates. In aspects, an update agent receives a request to scan for updates for a target. The target may include a virtual or non-virtual device. The request may include one or more rules that indicate resources to check to determine attributes of the device. The update agent utilizes a resource accessor to access the resources indicated by the rules. The resource accessor maps resource names indicated by the update agent to corresponding resource names of the target. The update agent may provide results of evaluating the rules to an update source in a multi-pass protocol designed to eliminate irrelevant updates.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
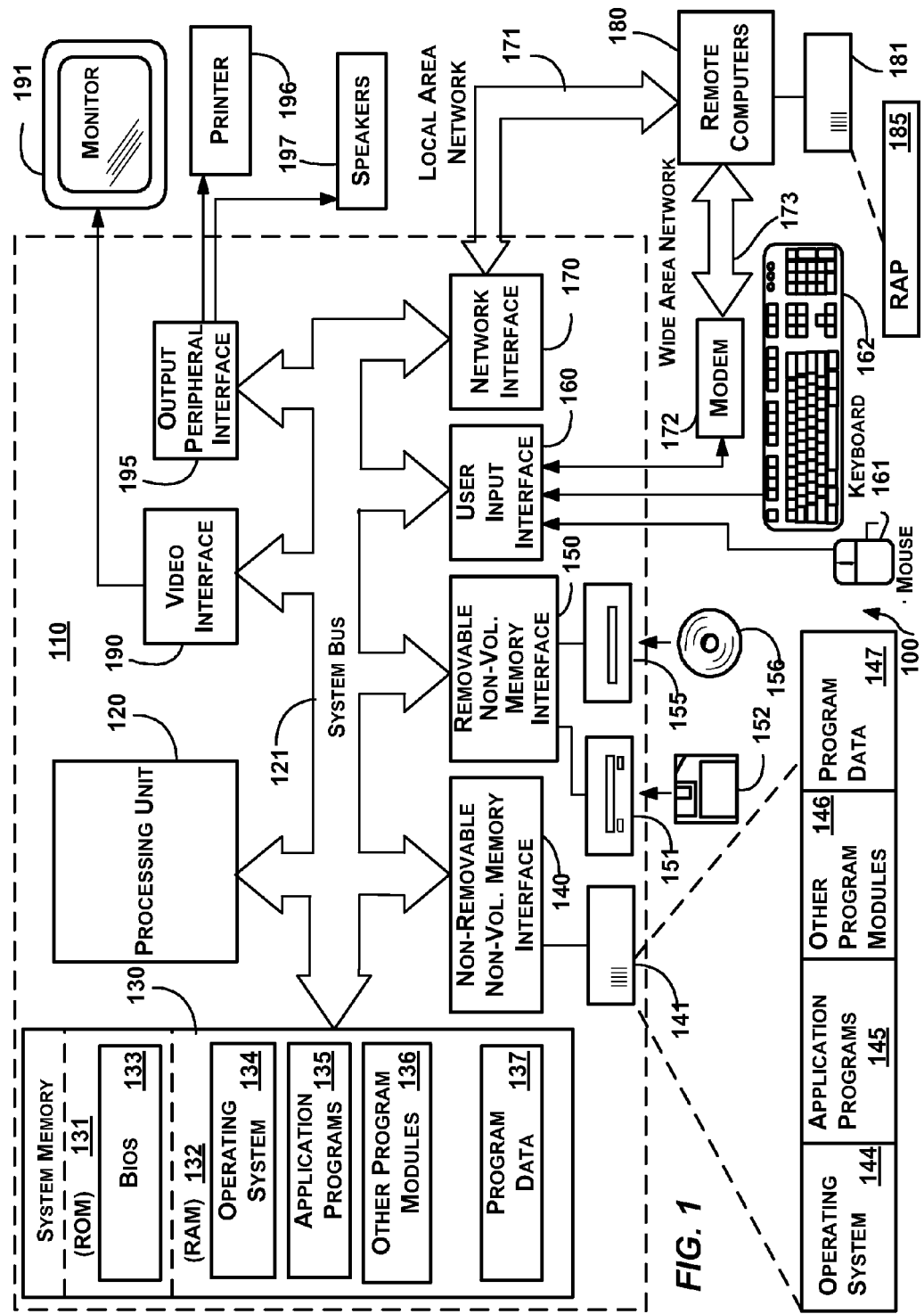
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Updates

As mentioned previously, with the shift to virtual machines, updating software on the virtual machines can become a significant maintenance activity. A virtual environment is an environment that is simulated or emulated by a computer. The virtual environment may simulate or emulate a physical machine. This machine that is simulated or emulated is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth.

More than one virtual machine may be hosted on a single computer. That is, two or more virtual machines may execute on a single physical computer. To software executing in each virtual machine, the virtual machine appears to have its own hardware even though the virtual machines hosted on a single computer may physically share one or more physical devices with each other and with the hosting operating system.

Aspects of the subject matter described herein may also be applied to application virtualization. In application virtualization, one or more resources (such as a registry, file system, libraries, and the like) of an operating system are virtualized and presented to an application. This may be done, for example, via a virtualization layer that intercepts requests for the resources. When accessing virtualized resources, the application believes that it is accessing normal resources of the operating system. Wherever the term "virtual machine" is used herein, it is to be understood that in other embodiments, the teachings herein may also be applied to application virtualization.

Although virtual machines are sometimes referred to herein, aspects of the subject matter described herein may be applied to other devices. For example, aspects of the subject matter described herein may be applied to non-virtual devices such as printers, routers, refrigerators, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Figure 2:
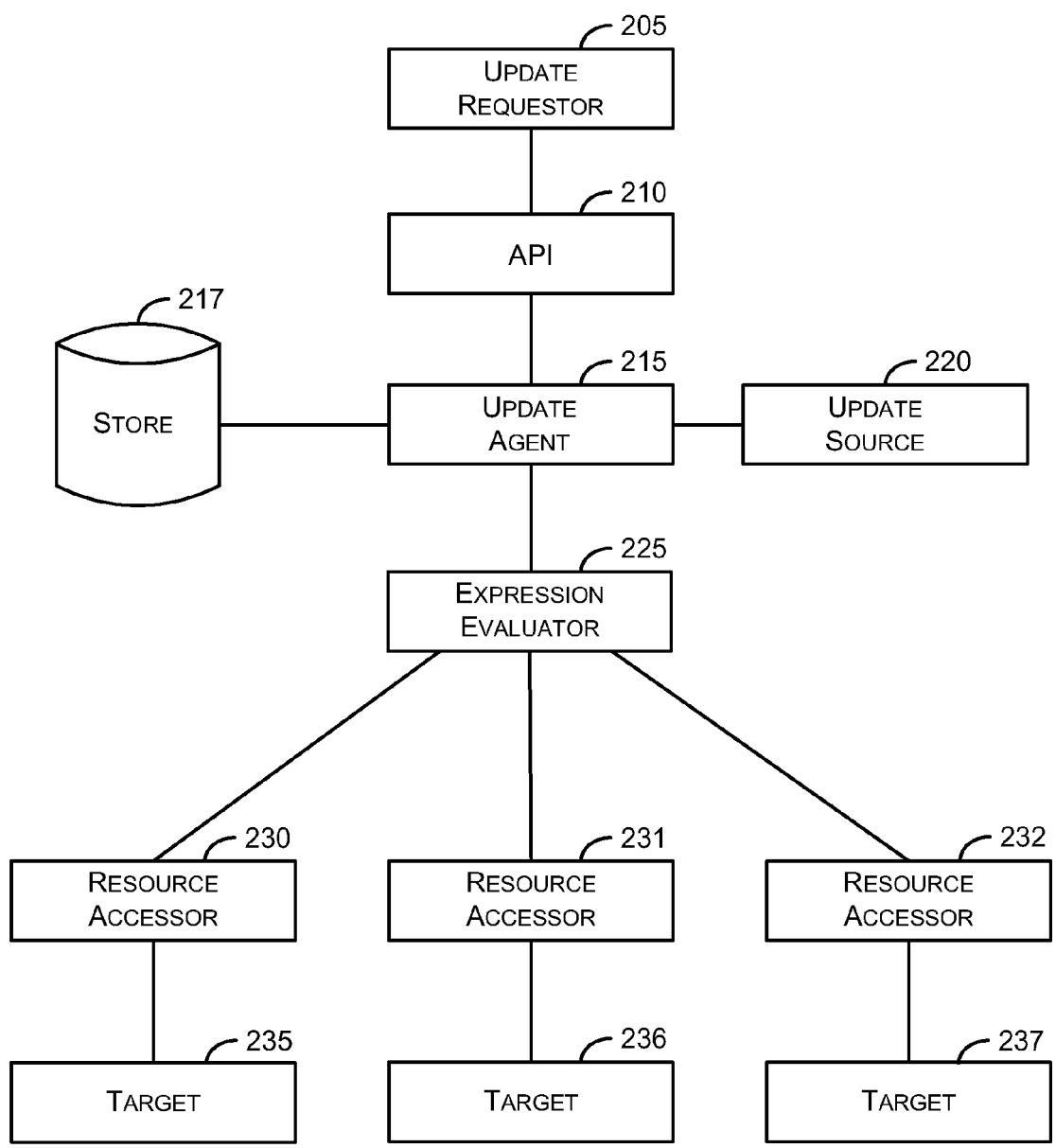
FIG. 2 is a block diagram that represents an exemplary system in which aspects of the subject matter described herein may be implemented.

FIG. 2 is a block diagram that represents an exemplary system in which aspects of the subject matter described herein may be implemented. The environment may include an update requestor 205, an application programming interface (API) 210, an update agent 215, an update source 220, a transient or persistent store 217, an expression evaluator 225, one or more resource accessors 230-232, one or more targets 235-237. Sometimes one of the above may be referred to as an entity, and two or more of the above may be referred to as entities.

The entities illustrated in FIG. 2 are exemplary and are not meant to be all-inclusive of entities that may be needed or included. In other embodiments, two or more of the entities and/or functions described in conjunction with FIG. 2 may be combined, included in other entities (not shown), or divided into sub-entities without departing from the spirit or scope of aspects of the subject matter described herein.

The entities may comprise components of a computer system. As used herein, the term component is to be read to include all or a portion of a device, a collection of one or more software modules or portions thereof, some combination of one or more software modules or portions thereof and one or more devices or portions thereof, and the like.

The entities may be located relatively close to each other or may be distributed across a wide area. In one embodiment, groups of two or more of the entities may be hosted on the same physical or virtual machine. In other embodiments, each of the entities may be hosted on a different physical or virtual machine.

Entities that are hosted on different machines may be able to communicate with each other via various networks including one or more local area networks, one or more telephone networks, one or more wide area networks, direct connections, virtual connections, private networks, virtual private networks, some combination of the above, and the like.

Entities that are hosted on the same machine may be able to communicate with each other via inter-process, intra-process, or other communication channels.

The update requestor 205 may comprise a component that requests via the API 210 that one or more of the targets 235-237 be scanned for applicable updates. For example, the update requestor 205 may comprise a software module that receives and responds to input from a system administrator or the like. Upon instruction by the administrator, the update requestor 205 may request that a target be scanned for applicable updates.

As another example, the update requestor 205 may be associated with or part of a virtual machine library manager. Periodically, upon receipt of notification of new updates, or at other times, the virtual machine library manager may instruct the update requestor 205 to request that one or more virtual machines in the library be scanned.

The API 210 provides a programming interface by which instructions may be sent to and responses may be provided by the update agent 215. The API 210 may provide an interface that can be called by processes on remote devices.

The update agent 215 may comprise a component that is in charge of detecting applicable updates for one or more targets. The update agent 215 may do so by evaluating one or more rules against resources of the one or more targets. A rule may be associated with or embodied in one or more expressions. The one or more expressions may be evaluated to determine attributes of the target. These attributes may include information about software, hardware, configuration data, application data, state, and the like of the device.

For example, an attribute may include a version of a software application installed on the target. As another example, an attribute may include a value in a registry or other database. As another example, an attribute may be a language used on the target. As yet another example, an attribute may be data in a database. As yet another example, an attribute may include data about a hardware component installed on a device. Some other examples include a screen size and resolution of the target, hard disk size, total RAM, cache, processor type and speed.

The examples above are not intended to be all-inclusive or exhaustive. Indeed, in one embodiment, an attribute of a device may include any data about the device that can be determined by a executing a fully-privileged process on the target.

The rules may be conveyed with an update that includes code. The rules may indicate whether the update is applicable to a target. The code may include data that, if applied, modifies the state of the target. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include program code, program state, program data, other data, and the like.

An update may include new software, updates to existing software, modifications to system settings or policy, database updates, interactive notifications to a user of the target, and the like.

Some updates may not include code but may include only rules that may be used to detect the state of the target. Such updates are sometimes referred to herein as "detectoids." A detectoid may be used to determine attributes of a particular target. For example, the existence of certain registry keys, folders, files, directories, environment variables, and/or other data on a target may indicate that word processing software of a particular version is installed on the target. For example, an expression may be evaluated that determines whether the file resource named "c:\program files\foo.exe" exists and is greater than version 1.0.

An update may have one or more dependencies. For example, whether to apply an update may depend on attributes of the target system, such as whether other software and/or updates have already been successfully applied on the target. For example, an update that includes a version 3 of a software package may need to be applied after an update that includes version 2 of the software.

In evaluating a detectoid or an expression of another update, the update agent 215 may generate data that may then be passed back to the update source 220. The data may allow the update source 220 to apply an efficient scan protocol (described in more detail below) by filtering out updates that do not apply because their dependencies are not satisfied. For example, if a word processor is not installed, there is no need for the update source 220 to even send an update of the word processor to the client for evaluation.

The update source 220 may comprise a component that, based on data received from the update agent 215, determines what updates may need to be installed on the target. In one embodiment, the update source 220 may comprise a service. A service may include one or more processes, threads, components, libraries, and the like that perform a designated task. A service may be implemented in hardware, software, or a combination of hardware and software. A service may be distributed over multiple devices or may be implemented on a single device.

In another embodiment, the update source 220 may comprise a file, data structure, or the like that includes update information for the update agent 215. For example, the update source 220 may comprise executable code that provides update information to the update agent 215. As another example, the update source 220 may comprise a CAB file, MSI file, or some other file.

The update source 220 may execute a multi-pass protocol to efficiently provide updates. In the multi-pass protocol, the update source 220 may first send the update agent 215 a set of updates (including detectoids) that have no dependencies. The update agent 215 may evaluate the rules of these updates and inform the update source 220 as to attributes of the target.

In evaluating the rules of a detectoid, the state of one or more resources may be compared to one or more values. For example, a rule may compare a particular registry key to the value of 5. The result of evaluating a rule may be provided by the update agent 215 to the update source 220. Based on the result (and possibly other results), the update source 220 may determine whether to send additional detectoids or updates to the update agent 215.

In a next iteration of the protocol, the update source 220 may send updates which depend on the software and/or updates which were detected as installed in the previous iteration. The update agent 215 may then evaluate the rules of these additional updates and send the results to the update source 220.

This process may continue until no more updates are available that depend on attributes of the target device. In one sense, this process may be viewed as trimming away irrelevant branches of a tree or graph in each iteration based on results provided to the update source 220. The update source 220 may start the process by sending updates (including detectoids) that do not depend on other updates and may send other updates depending on the results of the previous updates. This multi-pass protocol may be used to efficiently prune out updates that do not apply to the target and thus reduce the cost of detecting the updates needed for a target.

The update agent 215 may store data that indicates what is installed on a particular target. This data may be stored in a document that "travels with" the target. In one embodiment, the document may be stored in a memory device (e.g., a virtual disk image) of the target. In another embodiment, the document may be stored on a store (e.g., the store 217) outside of the target together with an identifier that associates the document with the target. In subsequent scans of the target, this stored data may be used as a starting point for determining what updates are needed for the target.

The store 217 may include any storage media capable of providing access to data including results regarding previous scans of targets. The store may include volatile memory (e.g., a cache) and non-volatile memory (e.g., a persistent storage). The store 217 may comprise hard disk storage, other non-volatile storage, volatile memory such as RAM, other storage, some combination of the above, and the like and may be distributed across multiple devices. The store 217 may be external, internal, or include components that are both internal and external to an apparatus hosting the update agent 215.

In one embodiment, rules and other data provided by the update source 220 to the update agent 215 may be encoded in Extensible Markup Language (XML). In other embodiments, however, the expressions may be encoded in other languages, data structures, or the like.

In one example, the interaction between the update agent 215 and the update source 220 may include the following exemplary actions:

1. The update agent 215 connects to the update source 220 and requests that the update source 220 provide all updates that have no dependencies.

2. In response, the update source 220 sends such updates to the update agent 215. Such updates may include many detectoids to detect the operating system, application files, and other state of the target.

3. The update agent 215 evaluates the rules of the updates which may include evaluating one or more expressions. In evaluating the expressions, the update agent 215 may compute a set of results (e.g., Boolean values) that indicate updates and detectoids already installed on the target based on the evaluation of expressions against software and/or hardware installed on the target or other target machine state.

4. The update agent 215 sends the results to the update source 220.

5. The update source 220 determines the updates that depend on what is already installed on the target. For example, if a word processor of a certain version is installed on the machine, the update source 220 may determine whether there are any updates that depend on the version of the word processor. As another example, if it is determined that the language of the target is German, the update source 220 may eliminate updates that pertain to other languages.

6. The update source 220 sends the next set of updates to the update agent 215.

7. Steps 3-6 above are repeated until there are no new updates that depend on what is already installed on the target.

When the target is a virtual machine, detecting the software installed in the virtual machine may be performed without running the virtual machine. A virtual machine may be stored as an image on a disk. This image may be accessed via the virtual machine or via another entity such as a resource accessor. When a target is an offline virtual machine, the names of resources associated with the target may be different than when the resources are accessed by the virtual machine when executing. For example, when accessed by the virtual machine, names of resources on a disk of the virtual machine may start with a "C:\". When the same disk is accessed outside of the virtual machine, for example, names of resources on the disk may start with a "D:\".

The rules included in an update, however, may be created in anticipation of using with the original resource names. If the rules are evaluated directly against the resource names of an offline image, the appropriate resources may not be found or accessed.

This same problem may occur when using other data that may evaluate into a resource name. For example, system variables, component identifiers, folders including shell folders and other folders, registry entries, and other data that may be used in locating resources may be different when accessing the resources while the virtual machine is offline.

Resource accessors 230-232 may be used to access the appropriate resources on the targets 235-237. Each resource accessor may include a mapping table or other data structure that associates resource names or portions thereof with mapped to resource names or portions thereof. For example, the mapping table may include an entry that associates "C:\" with "D:\". When a resource accessor receives a request to access a resource with a name that starts with "C:\", the resource accessor may use the mapping table to substitute a "D:\" at the start of the resource name to access the resource on the offline virtual machine.

Likewise, some resource names may be prefixed by variables (e.g., "$(program files)", "$(system)", and so forth). The mapping table may include entries for these variables that map the variables to prefixes on the target that correspond to the resource names.

There may be multiple levels of mapping that occur to access a resource. For example, an expression may indicate that a resource name is found in a certain key of a registry. One mapping may be used to find the registry (e.g., a mapping that replaces "C:\" with "D:\"). After the registry has been located and the value associated with the key obtained, another mapping may be used to map the resource indicated by the value to a location it may be found on the loaded image. For example, the registry value may refer to a resource on "C:\". To correctly access this resource on the loaded image, a mapping may be used to map from "C:\" to "D:\".

Although only two levels of mapping have been described in the example of the paragraph above, there is no intention to limit aspects of the subject matter to only two levels of mapping. Indeed, in other embodiments, there may be greater than two levels of mapping to access a resource. To determine a mapping in these cases may involve multiple operations. For example, an environment variable may include a resource name that refers to a database entry. The database entry may include another resource name that refers to a file location. The file may include another resource name that refers to the desired resource. In this example, to find the desired resource may involve multiple mapping operations.

Each resource accessor 230-232 may have a mapping table appropriate for its associated target (i.e., the targets 235-237, respectively). This may allow the update agent 215 to be used with many different types of targets and different instances of the same type from offline virtual machines (of different versions and/or from different vendors), online virtual machines, online or offline operating systems loaded on different partitions, other devices mentioned previously, and the like.

The update agent 215 may not need to be aware of the target type or its capabilities. Instead, the update agent 215 may send rules to access certain resources to the expression evaluator 225 which may access resources via the resource accessors 230-232. The resource accessors 230-232 may then make the appropriate translations based on individualized mapping tables to access the appropriate resources.

It will be understood by those skilled in the art that the update mechanism described in conjunction with FIG. 2 provides flexibility and extensibility. For example, when a system administrator or the like desires to add a new target of a different type, a mapping table may be created and provided to a resource accessor to allow access to the new target.

A mapping table may be created or populated automatically, semi-automatically, or manually. For example in an automatic or semi-automatic population, when the update agent 215 is instructed to update an offline virtual machine, the update agent 215 may mount (e.g., as "D:\") an image of a disk associated with the virtual machine. The update agent 215 may also access metadata associated with the virtual machine to determine a resource name (e.g., "C:\") that the virtual machine associates with the disk. The update agent 215 may then create a mapping entry from the name used by the virtual machine (e.g., "C:\") to the name given to the mount (e.g., "D:\").

As another example, environment variables or other resource location information (e.g., paths or portions thereof) may be defined in a registry of a virtual machine. For environment variables that are associated with resources, one or more mapping entries may be automatically created that map the environment variables or other resource location information to the appropriate resource names for the mounted disk.

Certain mappings may be created manually. For example, a temp directory of a brand of mobile devices may be hardcoded to a particular location. In this case, a mapping entry for the temp directory may be hardcoded into the mapping table.

Although the system described above in conjunction with FIG. 2 includes various entities and related communication paths, it will be recognized that more, fewer, or a different combination of these entities and others may be employed without departing from the spirit or scope of aspects of the subject matter described herein. Furthermore, the entities and communication paths included in the system may be configured in a variety of ways as will be understood by those skilled in the art without departing from the spirit or scope of aspects of the subject matter described herein.

Figure 3:
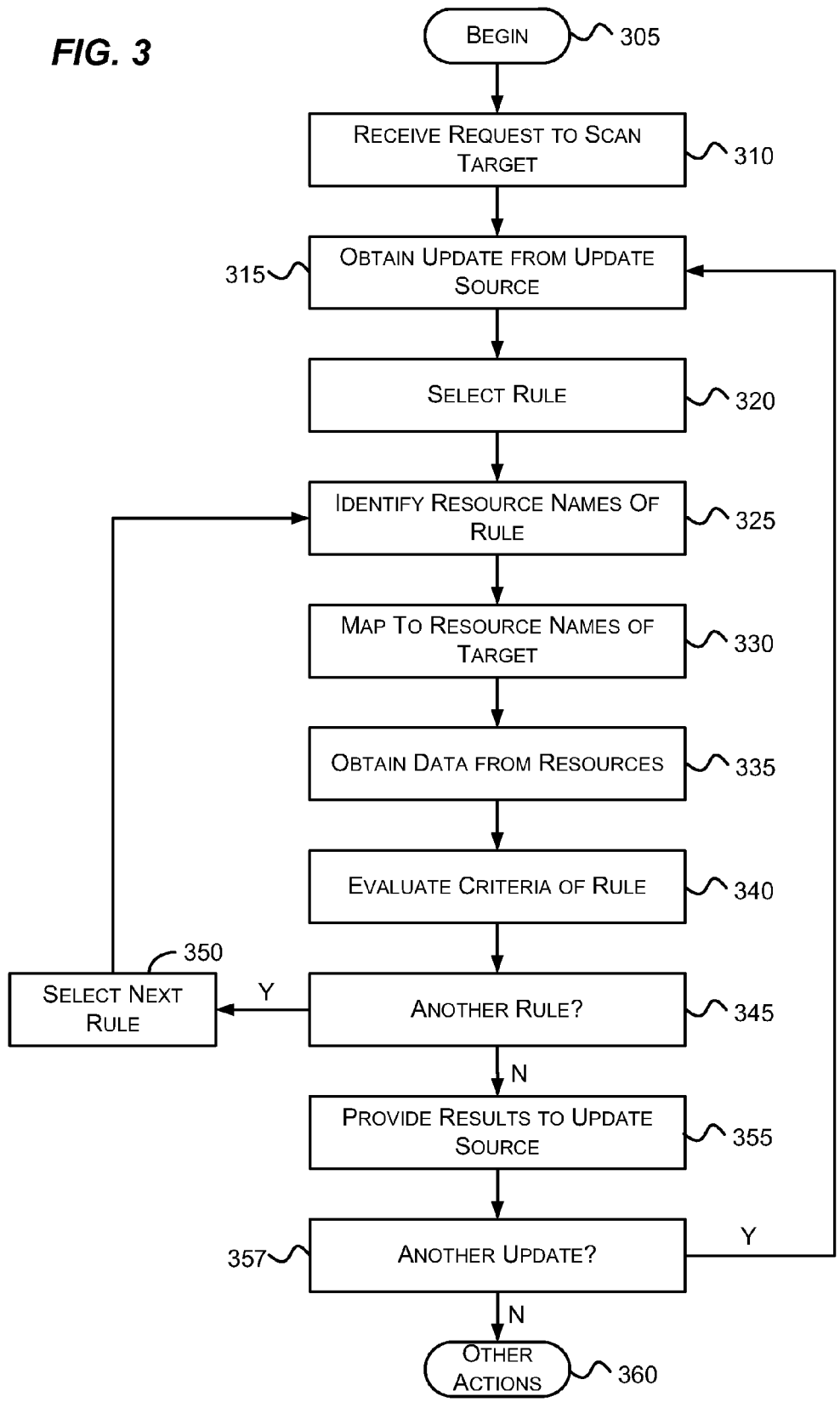
FIG. 3 is a flow diagram that generally represents exemplary actions that may occur in detecting needed updates for a target in accordance with aspects of the subject matter described herein.
Figure 4:
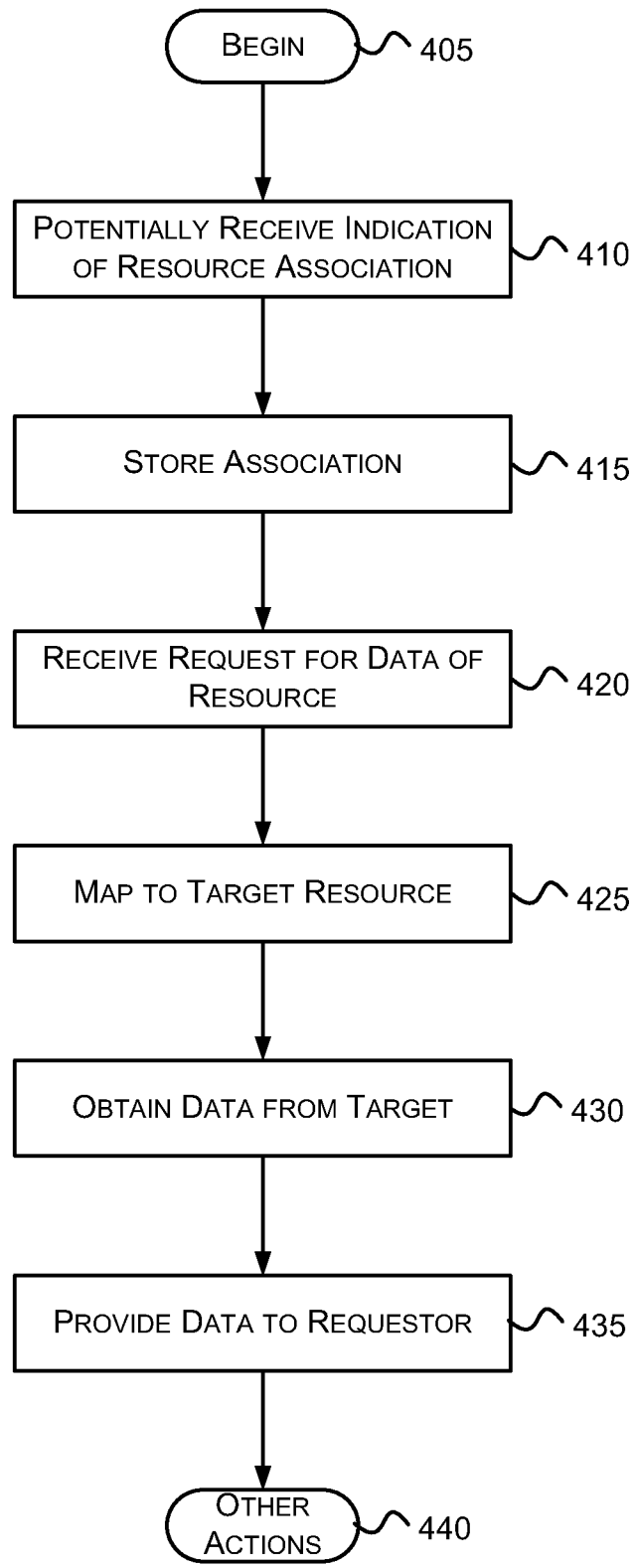
FIG. 4 is a flow diagram that generally represents exemplary actions that may occur in accessing a resource on a target in accordance with aspects of the subject matter described herein.

FIGS. 3-4 are flow diagrams that generally represent actions that may occur in accordance with aspects of the subject matter described herein. For simplicity of explanation, the methodology described in conjunction with FIGS.

3-4 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 3 is a flow diagram that generally represents exemplary actions that may occur in detecting needed updates for a target in accordance with aspects of the subject matter described herein. At block 305, the actions begin.

At block 310, a request to scan a target is received. The request is received at an entity other than the target. For example, referring to FIG. 2, the update agent 210 receives a request from the update requestor 205 via the API 210. In conjunction with receiving a request to scan a target, the update agent 210 may, based on the target, select a mapping data structure from a plurality of mapping data structures where each mapping data structure is applicable to a predefined type of target or instance of a type of target.

A mapping data structure may include one or more mappings from resources indicated by updates to resources of the target. Furthermore, a mapping data structure may indicate an algorithm by which a resource of the target is to be obtained. For example, a mapping data structure may specify an algorithm that obtains the resource from a local or remote target using one or more operations that may involve one or more APIs. A mapping data structure is not limited to pairs of values in a table and may be encoded in code that includes, for example, if then else statements, switch statements, other statements, or the like to obtain data of a resource from a corresponding resource of the target.

Furthermore, the method of accessing the corresponding resource on the target may be different from accessing a similarly named resource from another source. For example, in a Windows® environment for an online machine, a process may access a resource by calling a Win32 API (e.g. querying the WMI store or calling GetSystemMetrics). For an offline image, accessing that same resource might not be done via a call to the same API; rather, an accessor might have to directly access the underlying storage (e.g., the registry of the offline image).

In addition, in conjunction with receiving the request, the update agent 215 may receive an indication of a mapping from a resource name indicated by the rule to a corresponding resource name of the target. For example, the update requestor may indicate that an image corresponding to a virtual machine has been loaded onto a network share of \\server\share\VMImage. This information may be used to create a mapping in the mapping data structure.

At block 315, rules of an update are requested from an update source. The rules may be conveyed with updates as mentioned previously. The rules indicate resources to check to determine attributes of the target. For example, referring to FIG. 2, the update agent 215 may request updates from the update source 220. Furthermore, in requesting rules, the update agent 215 may obtain results of a previous scan from the target 235 or the store 217 and may pass these results to the update source 220 in conjunction with requesting rules from the update source.

At block 320, one of the rules is selected. One or more rules may be returned by the update source 220. For example, referring to FIG. 2, the update agent 215 may determine (or be informed) as to an order in which to evaluate the rules and may select the first rule of the order.

At block 325, resource names of the rule are identified. For example, referring to FIG. 2, the update agent 215 may identify resource names indicated by the rule. As mentioned previously, a rule may identify resources and values to which to compare the resources. A rule may be specified in XML or some other data structure that indicates resources, comparison operators, and values.

At block 330, identified resource names are mapped to target resource names. This may involve determining one or more corresponding resource names of the target using a mapping data structure. For example, referring to FIG. 2, the resource accessor 230 may map a resource name (e.g., "C:\Path\File") provided by the update agent 215 to a resource name of the target 235 (e.g., "D:\Path\File").

At block 335, at least some of the data from the mapped resources of the target is obtained. When a resource value includes a resource name, obtaining the data may involve multiple mapping operations as described previously. For example, referring to FIG. 2, the resource accessor 230 may obtain a value from an image of a virtual machine corresponding to the target 235.

At block 340, one or more expressions of the rule are evaluated to compare the data to one or more criteria indicated by the rule. Evaluating the one or more expressions produces a result indicative of at least one of the software and/or hardware installed on the target. For example, referring to FIG. 2, the expression evaluator 225 may evaluate an expression of the rule to determine a result indicative of software and/or hardware installed on the target 235.

At block 345, a determination is made as to whether there is another rule in the update. If so, the actions continue at block 350; otherwise, the actions continue at block 355.

At block 350, a next rule is selected. After block 350, the actions associated with 325-345 may be repeated.

At block 355, the results are provided to the update source. For example, referring to FIG. 2, the update agent 215 may provide results of evaluating rules to the update source 220.

At block 357, a determination is made as to whether this is another update for the scan. If so, the actions continue at block 315; otherwise, the actions continue at block 360.

At block 360, other actions, if any, may be performed. Other actions may include, for example, storing the results produced by evaluating the expressions, receiving another request to scan the target, retrieving the results, providing the results to the update source, and receiving, from the update source, additional rules that depends at least in part on the results.

FIG. 4 is a flow diagram that generally represents exemplary actions that may occur in accessing a resource on a target in accordance with aspects of the subject matter described herein. At block 405, the actions begin.

At block 410, an indication may be received of an association that associates a resource name or portion thereof with another resource name or portion thereof. For example, referring to FIG. 2, the resource accessor 231 may receive an indication that requests to "C:\" map to "D:\VMs\VM1".

At block 415, if an association is received, it is stored in a mapping data structure. For example, referring to FIG. 2, the resource accessor 231 may store the association in a mapping table associated with the target 236.

At block 420, a request for at least some data of a resource of a target is received. The request may include a first resource name. For example, referring to FIG. 2, the update agent 215 may request some data from a file and may indicate a resource name of "C:\pathname\file" of the file.

At block 425, the resource name is mapped to a target resource name. For example, referring to FIG. 2, the resource accessor 231 may map the resource name of "C:\pathname\file" to a target resource name of "D:\VMs\VM1\pathname\file" using a mapping table. This target resource name identifies the resource (e.g., "D:\VMs\VM1\pathname\file") of the target 236 that corresponds to the resource name (e.g., "C:\pathname\file") provided to the resource accessor 231.

At block 430, the requested data is obtained from the target using the target resource name. For example, referring to FIG. 2, the resource accessor 231 may use the resource name "D:\VMs\VM1\pathname\file" to obtain at least some data from a registry file associated with the target 236.

At block 435, the data is provided to the requestor. For example, referring to FIG. 2, the resource accessor 231 provides the requested data to the update agent 215.

The actions associated with blocks 420-435 may be repeated for each resource of a scan.

At block 440, other actions, if any, may be performed. For example, referring to FIG. 2, if the data in the resource refers to another resource, more mapping may be performed to obtain the correct resource from the target 236.

As can be seen from the foregoing detailed description, aspects have been described related to detecting needed updates. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving a request to scan a target to determine updates for the target, the request received at an entity other than the target;
   requesting, via the entity, rules from an update source, the rules indicating resources to check to determine attributes of the target; and
   for each rule, performing, via the entity, a plurality of operations to scan the target to determine the updates for the target in response to receiving the request to scan the target, the plurality of operations comprising:
      identifying one or more resource names indicated by the rule;
      determining one or more corresponding resource names of the target using a mapping data structure;
      obtaining at least some data of resources identified by the corresponding resource names of the target; and
      evaluating an expression to compare the at least some data to one or more criteria indicated by the rule, the evaluating an expression producing a result indicative of at least one of the attributes of the target.

2. The method of claim 1, wherein said receiving a request to scan a target comprises receiving a request to scan a virtual machine that is offline and wherein said obtaining at least some data of resources identified by the corresponding resource names of the target comprises obtaining the at least some data without bringing the virtual machine online.

3. The method of claim 1, wherein said receiving a request to scan a target comprises receiving a request to scan a virtual machine that is online and wherein said obtaining at least some data of resources identified by the corresponding resource names of the target comprises obtaining the at least some data via an image associated with the virtual machine, the image residing on one or more of volatile and non-volatile memory.

4. The method of claim 1, wherein said receiving a request to scan a target comprises receiving a request to scan a device other than a virtual machine and wherein said obtaining at least some data of resources identified by the corresponding resource names of the target comprises obtaining the at least some data from the device or storage associated with the device.

5. The method of claim 1, further comprising, for a rule, using the at least some data to obtain another resource name, mapping the another resource name to yet another resource name, and obtaining at least some data from the target from a resource corresponding to the yet another resource name.

6. The method of claim 1, wherein said requesting the rules from the update source comprises requesting rules that have no dependencies on results of other rules.

7. The method of claim 6, further comprising providing the results produced by evaluating the expressions to the update source together with a request for additional rules from the update source, the additional rules having dependencies on the rules, the update source configured to use the results produced by evaluating the expressions to select the additional rules, the additional rules for use in determining additional information about attributes of the target.

8. The method of claim 1, further comprising storing the results produced by evaluating the expressions, receiving another request to scan the target, retrieving the results, providing the results to the update source, and receiving, from the update source, additional rules that depend at least in part on the results.

9. The method of claim 1, further comprising obtaining results of a previous scan for updates from the target, providing the results to the update source, and receiving the rules from the update source.

10. The method of claim 1, further comprising, based on the target, selecting the mapping data structure from a plurality of mapping data structures, each mapping data structure being applicable to a pre-defined type of target.

11. The method of claim 1, further comprising generating one or more mappings from a resource name indicated by a rule to a corresponding resource name of the target by examining one or more attributes of the target.

12. In a computing environment, a system, comprising:
   an update agent, at least partially implemented by at least one processor, configured to receive a scan request to scan a target to determine updates for the target, the update agent residing on an entity other than the target, the update agent further configured to request rules from an update source, the rules indicating resources to check to determine attributes of the target;
   a resource accessor configured to receive a resource request for a resource of the target, the resource request indicating a resource name, the resource accessor further configured to determine a corresponding resource name of the target via a mapping data structure, the resource accessor further configured to obtain at least some data from a resource of the corresponding resource name from the target; and an expression evaluator configured to evaluate at least one expression of the rules by comparing the at least some data to one or more criteria of a rule and to produce a result based thereon.

13. The system of claim 12, wherein the target comprises an offline virtual machine and wherein the resource accessor is configured to obtain the at least some data without bringing the virtual machine online.

14. The system of claim 12, wherein the target comprises an online virtual machine and wherein the resource accessor is configured to obtain the at least some data while the virtual machine is online.

15. The system of claim 12, wherein the target comprises a device other than a virtual machine and wherein the resource accessor is configured to obtain the at least some data from the device or a storage associated with the device.

16. The system of claim 12, further comprising a storage device configured to receive and store the results and provide them upon request, the update agent further configured to request the results from the storage device and to provide them to the update source in conjunction with requesting rules from the update source.

17. The system of claim 12, wherein the update agent is further configured to provide the result to the update source and request additional rules that depend on the result from the update source, the additional rules for use in determining additional information about attributes of the target.

18. A computer storage medium having computer-executable instructions, which when executed perform actions, comprising:
receiving, from an update agent, a request for at least some data of a resource of a target, the request including a first resource name, the update agent configured to scan the target to determine attributes of the target, the update agent configured to communicate with a multi-pass update source in determining the updates for the target, the update agent configured to use the at least some data in evaluating an expression to determine whether the at least some data satisfies one or more criteria of a rule used to determine an attribute of the target, the update agent residing on an entity other than the target;
mapping the first resource name to a second resource name, the second resource name identifying the resource of the target;
obtaining the at least some data of the resource from the target using the second resource name; and
providing the at least some data to the update agent.

19. The computer storage medium of claim 18, further comprising:
prior to receiving the request for at least some data, receiving an indication of an association that associates a resource name or portion thereof with another resource name or portion thereof;
storing the association in a mapping data structure; and
using the association in mapping the first resource name to the second resource name.

20. The computer storage medium of claim 18, further comprising obtaining a third resource name from the at least some data, mapping the third resource name to a fourth resource name of the target, obtaining at least some other data from a resource corresponding to the fourth resource name, and providing the at least some other data to the update agent.

* * * * *